United States Patent
Schmidt et al.

(10) Patent No.: US 11,511,584 B2
(45) Date of Patent: Nov. 29, 2022

(54) DECOUPLING BEARING FOR A SUSPENSION STRUT, SUSPENSION STRUT HAVING A DECOUPLING BEARING AND VEHICLE HAVING A SUSPENSION STRUT

(71) Applicants: Klaus Schmidt, Odenthal (DE); Holger Hennen, Essen (DE); Ole Götz, Braunschweig (DE)

(72) Inventors: Klaus Schmidt, Odenthal (DE); Holger Hennen, Essen (DE); Ole Götz, Braunschweig (DE)

(73) Assignees: ThyssenKrupp Bilstein GmbH, Ennepetal (DE); thyssenkrupp AG, Essen (DE)

(*) Notice: Subject to any disclaimer, the term of this patent is extended or adjusted under 35 U.S.C. 154(b) by 422 days.

(21) Appl. No.: 16/555,263

(22) Filed: Aug. 29, 2019

(65) Prior Publication Data
US 2020/0070611 A1 Mar. 5, 2020

(30) Foreign Application Priority Data
Aug. 29, 2018 (DE) .................. 10 2018 214 668.3

(51) Int. Cl.
*B60G 13/00* (2006.01)
*B60G 13/02* (2006.01)
(Continued)

(52) U.S. Cl.
CPC .......... *B60G 13/003* (2013.01); *B60G 13/02* (2013.01); *B60G 15/10* (2013.01); *F16F 7/121* (2013.01);
(Continued)

(58) Field of Classification Search
CPC .. B60G 13/003; B60G 13/02; B60G 2202/20; B60G 2204/128; B60G 15/14; B60G 15/17; B60G 2204/418; B60G 15/068
See application file for complete search history.

(56) References Cited

U.S. PATENT DOCUMENTS 4,256,292 A * 3/1981 Sullivan, Jr. ......... B60G 13/003
188/268
4,332,397 A * 6/1982 Steger ................... B60G 15/14
267/220

(Continued)

FOREIGN PATENT DOCUMENTS

DE 10225354 A 7/2006
DE 10 2014 005 602 A 10/2014
(Continued)

OTHER PUBLICATIONS

DE102016210121A1_ Friedrich Original Document and Translation retrieved from espacenet on Nov. 15, 2021 (Year: 2016).*

*Primary Examiner* — Paul N Dickson
*Assistant Examiner* — Caitlin Anne Miller
(74) *Attorney, Agent, or Firm* — thyssenkrupp North America, LLC

(57) ABSTRACT

A decoupling bearing for a suspension strut or a pneumatic suspension strut may include a suspension strut cup and a connecting element that can be connected to a vehicle body. A damping element may be arranged between the suspension strut cup and the connecting element. The suspension strut cup may be connected to the connecting element by the damping element. Further, the damping element may be adhesively bonded to the connecting element and the suspension strut cup in a force-transmitting manner, and/or the damping element may be adhesively bonded to the connect- (Continued)

ing element and an intermediate element in a force-transmitting manner. The intermediate element may be connected to the suspension strut cup.

20 Claims, 1 Drawing Sheet

(51) Int. Cl.
  *B60G 15/10* (2006.01)
  *F16F 7/12* (2006.01)
(52) U.S. Cl.
  CPC .... *B60G 2202/152* (2013.01); *B60G 2202/20* (2013.01); *B60G 2202/314* (2013.01); *B60G 2204/128* (2013.01); *B60G 2204/1262* (2013.01); *B60G 2204/418* (2013.01); *F16F 2224/0225* (2013.01)

(56) References Cited

U.S. PATENT DOCUMENTS

| | | | |
|---|---|---|---|
| 4,671,323 A | 6/1987 | Buma | |
| 4,721,325 A * | 1/1988 | Mackovjak | B60G 13/006 267/33 |
| 7,182,189 B2 * | 2/2007 | Schutz | B60G 15/067 188/321.11 |
| 8,127,900 B2 * | 3/2012 | Inoue | F16F 15/03 188/267 |
| 9,522,585 B2 * | 12/2016 | Jang | B60G 15/068 |

FOREIGN PATENT DOCUMENTS

| | | | | |
|---|---|---|---|---|
| DE | 10 2016 210 121 A | | 12/2017 | |
| DE | 102016210121 A1 * | | 12/2017 | ............... F16F 9/05 |
| EP | 1842701 A | | 10/2007 | |
| EP | 1932693 A | | 6/2008 | |

* cited by examiner

DECOUPLING BEARING FOR A SUSPENSION STRUT, SUSPENSION STRUT HAVING A DECOUPLING BEARING AND VEHICLE HAVING A SUSPENSION STRUT

CROSS REFERENCE TO RELATED APPLICATION

This application is a U.S. Non-Provisional Patent Application, which claims priority to German Patent Application No. DE 10 2018 214 668.3, filed Aug. 29, 2018, the entire contents of which are incorporated herein by reference.

FIELD

The present disclosure generally relates to suspension struts for vehicles.

BACKGROUND

In general, suspension struts have in the head region specific bearing arrangements for supporting the suspension struts on a vehicle body. In order to prevent a transmission of driving noises from the suspension strut to the vehicle body as well as possible, use is substantially made of a noise-insulating interlayer. The suspension strut can be decoupled from the vehicle body by the interlayer. In the normal driving mode of the vehicle, a compressive force is applied by the suspension strut to the interlayer. However, in certain driving situations, a tensile force can act on the interlayer. In order to transmit this occurring tensile force from the suspension strut to the vehicle body, complicated positive-locking connections are often established between the bearing arrangement and the suspension strut.

Such a positive-locking connection is known, for example, from German Patent No. DE 102 25 354 B4. Here, a head bearing of a pneumatic suspension strut comprises a supporting element, an abutment and a damping element. The supporting element is releasably fastened to a vehicle body. The abutment corresponds to a spring cup bottom of the pneumatic suspension strut and supports the pneumatic spring against the body. The spring cup bottom has a groove-shaped bead which is formed on the radial circumference of the spring cup bottom. The damping element covers the groove-shaped bead of the spring cup bottom. The damping element is arranged between the supporting element and the spring cup bottom. To transmit or take up tensile forces, the supporting element is bent into the groove-shaped bead. The supporting element and the spring cup bottom are thus connected to one another in a positively locking manner. It is disadvantageous here that the positive-locking connection results in increased production costs and assembly costs. Furthermore, an increased constructional outlay is required as a result of the positive-locking connection.

Thus a need exists for a decoupling bearing for a suspension strut that decouples the suspension strut from a vehicle body through a simple and cost-effective design.

DETAILED DESCRIPTION

Figure 1:
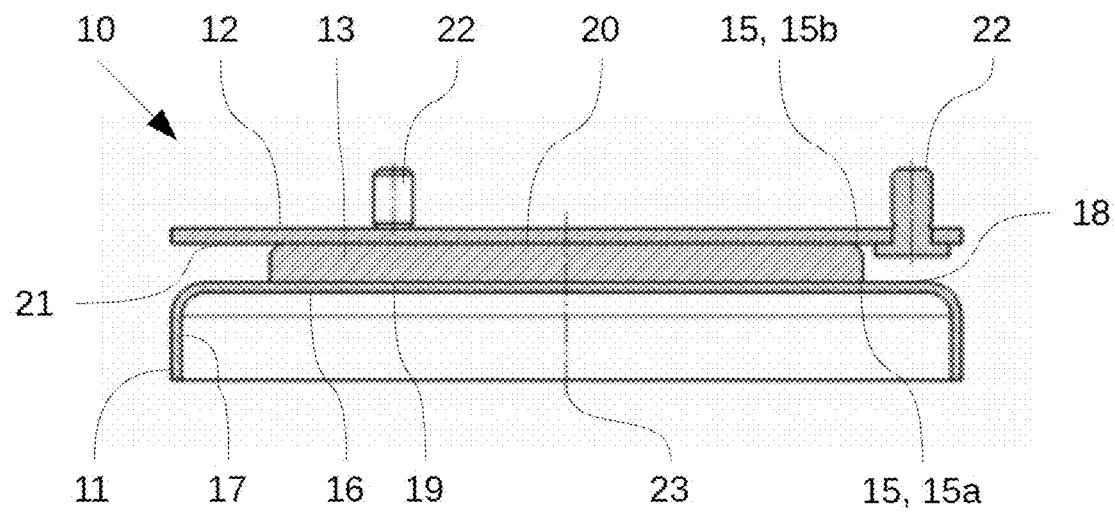
FIG. 1 is a cross-sectional view of an example decoupling bearing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to decoupling bearings for suspension struts, to suspension struts having decoupling bearings, and to vehicles having suspension struts.

The present disclosure is based on the idea of specifying a decoupling bearing for a suspension strut, in particular for a pneumatic suspension strut. The decoupling bearing comprises a suspension strut cup and at least one connecting element which can be connected to a vehicle body, wherein a damping element is arranged between the suspension strut cup and the connecting element. The suspension strut cup is connected to the connecting element by the damping element. The damping element is adhesively bonded to the connecting element and the suspension strut cup in a force-transmitting manner. Alternatively or additionally, the damping element is adhesively bonded to the connecting element and at least one intermediate element in a force-transmitting manner, wherein the intermediate element is connected to the suspension strut cup.

The present disclosure has various advantages. The arrangement of the damping element between the suspension strut cup and the connecting element allows the suspension strut to be decoupled from a vehicle body. The suspension strut is advantageously insulated from the vehicle body by the damping element and thus a transmission of driving noises to the vehicle body is reduced. The damping element is adhesively bonded to the connecting element and the suspension strut cup in a force-transmitting manner. This has the advantage that the damping element can take up compressive forces and tensile forces or transmit them from the suspension strut cup to the connecting element. The adhesive connection between the damping element and the connecting element and also the suspension strut cup can advantageously be produced in a simple and cost-effective manner. Furthermore, the adhesive connection obviates the need to form a complicated positive-locking connection between the connecting element and the suspension strut cup to transmit tensile forces. Consequently, a simple design of the decoupling bearing is achieved and overall costs are reduced.

Alternatively or additionally, the damping element is adhesively bonded to the connecting element and at least one intermediate element in a force-transmitting manner, wherein the intermediate element is connected to the suspension strut cup. Here, the intermediate element is arranged between the damping element and the suspension strut cup. The intermediate element advantageously allows a simple and quick mounting of the decoupling bearing on a suspension strut without damaging or releasing the adhesive connection. This likewise applies to a demounting of the decoupling bearing in the event of a required exchange.

In one example, the damping element interacts with the connecting element and the suspension strut cup for the purpose of transmitting a tensile force and/or a compressive force, and/or the damping element interacts with the connecting element and the intermediate element for the purpose of transmitting a tensile force and/or a compressive force. In addition to the compressive force, the damping element thus also advantageously transmits an occurring tensile force. No additional components are therefore required to take up or transmit a tensile force. It is advantageous here that a structurally simple design of the decoupling bearing is made possible and costs are saved by reducing the number of components.

In one example, the damping element has at least one contact surface by means of which the damping element is adhesively bonded at least partially, in particular over its whole surface. The partial adhesive bonding of the contact surface to at least one contact partner, such as, for example, the connecting element, the suspension strut cup and/or the intermediate element, makes it possible for the adhesive points to be distributed on the contact surface in an advantageous requirement-specific manner. This allows an improved set-up for transmitting tensile forces. The damping element may be adhesively bonded over its whole surface to the contact partners by means of the contact surface. It is advantageous here that a strength of the adhesive connection between the damping element and the contact partners is increased.

The contact surface of the damping element can form a completely closed surface. Furthermore, the damping element can have openings or cutouts, with the result that the contact surface of the damping element forms a partially closed surface. The contact surface can have a contact surface structure, in particular a contact surface profile. The contact surface structure may have a plurality of elevations, in particular small elevations, which are designed to project from the contact surface. The contact surface structure can be formed in such a way that the damping element can be substance-to-substance bonded to the contact partner and be connected thereto in a positive-locking manner. Here, an adhesive can be distributed on the contact surface structure when adhesively bonding the damping element to the contact partner. Curing of the adhesive can result in a positive-locking connection being formed between the damping element and the contact partner. The contact surface can also form a planar, in particular flat, surface.

The suspension strut cup, the connecting element and/or the intermediate element may each have/has at least one planar contact surface which can be adhesively bonded to the contact surface of the damping element. The planar contact surface advantageously allows an improved force transmission to be achieved and the strength of the adhesive connection to be increased. For this purpose, the planar contact surface may be formed on the suspension strut cup, connecting element and/or intermediate element orthogonally to the direction of action of the compressive force and/or tensile force.

The planar contact surface can be designed to be completely closed or partially closed. The planar contact surface can also have a contact surface structure, in particular a contact surface profile. The contact surface structure of the planar contact surface can correspond to the contact surface profile of the contact surface of the damping element. The contact surface structure of the planar contact surface can be designed to be complementary to the contact surface structure of the damping element.

The damping element can be formed from polyurethane, in particular cellular polyurethane. Cellular polyurethane advantageously has a plurality of small cells in which gas is enclosed. The enclosed gas provides the damping element with good acoustic insulation and damping properties combined at the same time which a low weight and increased service life. Cellular polyurethane is a compressible medium which can compensate for volume changes occurring upon axial relative movement between the suspension strut cup and the connecting element, in particular the vehicle body.

In one example, the damping element is disc-shaped. This has the advantage that the damping element, with the contact partners, allows a compact design of the decoupling bearing. Furthermore, the disc-shaped design of the damping element advantageously makes possible large-area contact surfaces, in particular adhesive surfaces, by means of which the adhesive connection between the damping element and the contact partners can be strengthened for improved force transmission.

In one example, the damping element has at least one edge which is of rounded-off design. Here, it is advantageous that, under a peeling load on the adhesively bonded damping element at the edge, an incipient tearing of the damping element material is prevented. A peeling load on the damping element occurs if a compressive force and/or tensile force is non-uniformly applied by the contact partners to the damping element. In other words, the contact partners are tilted relative to one another under a peeling load, with the result that force peaks arise in the edge of the damping element. The rounding-off of the edge advantageously causes the direction of action of the occurring forces to be redirected in such a way that the forces act transversely with respect to the adhesively bonded contact surfaces of the damping element and of the contact partners. An incipient tearing of the edge is thus prevented.

In one example, the intermediate element is releasably connected to the suspension strut cup. This has the advantage that the decoupling bearing can be mounted on the suspension strut cup or demounted from the suspension strut cup in a simple and quick manner. Assembly costs are thus saved.

A coordinate aspect of the present disclosure relates to a suspension strut, in particular a pneumatic suspension strut, having at least one decoupling bearing according to the present disclosure.

A further coordinate aspect of the present disclosure relates to a vehicle, in particular a motor vehicle or vehicle trailer, having at least one suspension strut according to the present disclosure.

With regard to the advantages of the suspension strut and of the vehicle, reference is made to the advantages explained in conjunction with the decoupling bearing. Moreover, the suspension strut and the vehicle can have, alternatively or additionally, individual features stated above with respect to the decoupling bearing or a combination of a number of said features.

FIG. 1 shows a decoupling bearing 10 having a suspension strut cup 11, a connecting element 12 and a damping element 13. The suspension strut cup 11 forms an upper end of a suspension strut (not shown). The suspension strut cup 11 has a cup bottom 16 and cup wall 17. The cup bottom 16 is disc-shaped. The cup bottom 16 has a cylindrical shape. The cup bottom 16 can also be plate-shaped. Here, the cup bottom 16 can have an angular cross-sectional shape or a free shape.

The cup wall 17 is designed so as to run around radially on the cup bottom 16. Here, the cup wall 17 is formed orthogonally to the cup bottom 16. The suspension strut cup 11 has a rotationally symmetrical shape. The suspension strut cup 11 is of thin-walled design. The suspension strut cup 11 can be formed by a sheet metal part. Here, the suspension strut cup 11 can be produced by a deep-drawing process. It is also conceivable for the suspension strut cup 11 to be formed by a plastic part. Here, for example, the suspension strut cup 11 can be produced by an injection-moulding process.

The suspension strut cup 11 has a cup bottom surface 18 which comprises a planar contact surface. The cup bottom surface 18 is arranged axially externally on the cup bottom 16. In other words, the cup bottom surface 18 is arranged on the cup bottom 16 axially with respect to the cup wall 17. The cup bottom surface 18 is designed to be planar, in particular flat. The cup bottom surface 18 can form a completely closed surface. Furthermore, the cup bottom surface 18 can have openings or cutouts, with the result that the cup bottom surface 18 forms a partially closed surface. The cup bottom surface 18 can have a contact surface structure, in particular a contact surface profile. Here, it is conceivable for the contact surface structure to have a plurality of elevations, in particular small elevations, which are designed to project from the cup bottom surface 18. The suspension strut cup 11 can be adhesively bonded to the damping element 13 by means of the cup bottom surface 18.

According to FIG. 1, the damping element 13 is disc-shaped. The damping element 13 can have a hollow cylindrical shape. The damping element 13 can be designed to be rotationally symmetrical. The damping element 13 can also be plate-shaped. Here, it is conceivable for the damping element 13 to have an angular, in particular polygonal, cross section. The damping element 13 is formed from a solid material. Here, the damping element 13 is formed in one piece. The damping element 13 can also have a divided, in particular multi-part, design. The damping element 13 is formed by an elastomer. Specifically, the damping element 13 is formed by polyurethane. The damping element 13 can be formed by cellular polyurethane. The damping element 13 can be designed to be dimensionally stable and elastic. In other words, following a transmission of tensile forces and/or compressive forces, the damping element 13 can be brought back into an initial shape without losing its elastic and noise-insulating properties.

The damping element 13 further has a first contact surface 19 and a second contact surface 20. The contact surfaces 19, 20 form axial end faces of the damping element 13. The contact surfaces 19, 20 are designed to be planar, in particular flat. The contact surfaces 19, 20 of the damping element 13 can each form a completely closed surface. Furthermore, the damping element 13 can have openings or cutouts, with the result that the contact surfaces 19, 20 of the damping element 13 each form a partially closed surface. The contact surfaces 19, 20 can have a contact surface structure, in particular a contact surface profile. Here, it is conceivable for the contact surface structure to have a plurality of elevations which are designed to project from the respective contact surface 19, 20.

As is clearly evident in FIG. 1, the damping element 13 has a first edge 15a and a second edge 15b. The edges 15a, 15b are delimited by the contact surfaces 19, 20 and an in between circumferential surface of the damping element 13. The first edge 15a is assigned to the first contact surface 19. The first edge 15a is formed on the damping element 13 so as to run around the first contact surface 19. The second edge 15b is assigned to the second contact surface 20. The second edge 15b is formed on the damping element 13 so as to run around the second contact surface 20. The respective edge 15a, 15b can be formed on the damping element 13 so as to run around the respective contact surface 19, 20 continuously. Furthermore, the respective edge 15a, 15b can be formed on the damping element 13 so as to run around the contact surface 19, 20 in an interrupted, in particular divided, manner.

The second edge 15b of the damping element 13 is of rounded-off design. The second edge 15b can also be formed by a peripheral bevel. Furthermore, the first edge 15a of the damping element 13 can also be rounded off or designed as a peripheral bevel.

The connecting element 12 shown in FIG. 1 is disc-shaped. Here, the connecting element 12 can be designed to be rotationally symmetrical. The connecting element 12 can be formed by a sheet metal disc or a metal plate. It is also conceivable for the connecting element 12 to consist of plastic.

The connecting element 12 has a connecting element surface 21 which comprises a further planar contact surface. Here, the connecting element surface 21 is formed like the above-described cup bottom surface 18. Furthermore, the connecting element 12 has one or more through-openings in each of which a fastening means 22 is arranged. The connecting element 12 can be connected to a vehicle body (not shown) by the fastening means 22. In other words, the decoupling bearing 10 can be connected to a vehicle body by the connecting element 12.

According to FIG. 1, the fastening means 22 are formed by fastening screws. The fastening means 22 can also be formed by fastening pins or by clamping elements. The connecting element 12 can be releasably connected to the vehicle body by the fastening means 22.

As shown in FIG. 1, the damping element 13 is arranged between the suspension strut cup 11 and the connecting element 12. The suspension strut cup 11 is connected to the connecting element 12 via the damping element 13. The suspension strut cup 11, the connecting element 12 and the damping element 13 have a common longitudinal axis 23.

The damping element 13 is adhesively bonded to the connecting element 12 and the suspension strut cup 11 in a force-transmitting manner. Specifically, the first contact surface 19 of the damping element 13 is adhesively bonded to the cup bottom surface 18 of the suspension strut cup 11 in a force-transmitting manner. Furthermore, the second contact surface 20 of the damping element 13 is adhesively bonded to the connecting element surface 21 of the connecting element 12 in a force-transmitting manner. The damping element 13 and the suspension strut cup 11 are connected to one another in a tensile-force-resistant manner by adhesive bonding. Furthermore, the damping element 13 and connecting element 12 are connected to one another in a tensile-force-resistant manner by adhesive bonding.

The damping element 13 is substance-to-substance bonded to the suspension strut cup 11 and the connecting element 12 by adhesive bonding. The damping element 13 can also be substance-to-substance bonded to the suspension strut cup 11 and the connecting element 12 by adhesive bonding and be connected thereto in a positive-locking manner. The first contact surface 19 of the damping element 13 is adhesively bonded, partially or over its whole surface, to the spring cup bottom 16 of the suspension strut cup 11. Furthermore, the second contact surface 20 of the damping element 13 is also adhesively bonded, partially or over its whole surface, to the connecting element 12.

The damping element 13 interacts with the connecting element 12 and the suspension strut cup 11 for the purpose of transmitting a tensile force and/or a compressive force.

Figure 2:
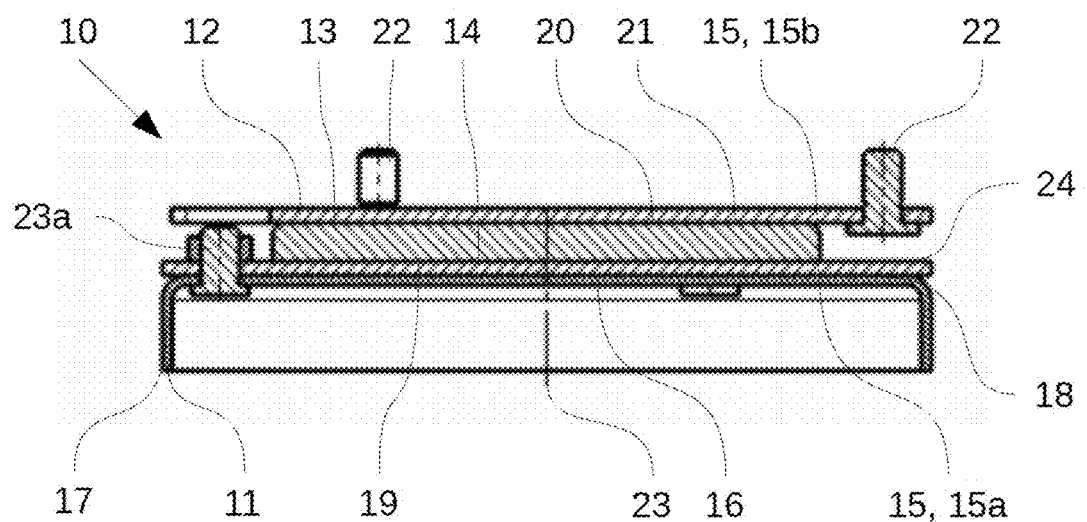
FIG. 2 is a cross-sectional view of another example decoupling bearing.

FIG. 2 shows a decoupling bearing 10 having a suspension strut cup 11, a connecting element 12, a damping element 13 and an intermediate element 14. By contrast with the decoupling bearing 10 according to FIG. 1, in the decoupling bearing 10 according to FIG. 2 the intermediate element 14 is additionally arranged between the damping element 13 and the suspension strut cup 11. The intermediate element 14 will be discussed later in more detail.

The suspension strut cup 11 according to FIG. 2 corresponds to the suspension strut cup 11 as described in FIG. 1. In addition thereto, the suspension strut cup 11 according to FIG. 2 has in the cup bottom 16 one or more through-openings in each of which a further fastening means 23a is arranged. The intermediate element 14 is releasably connected to the spring cup bottom 16 by the further fastening means 23a. The further fastening means 23a is formed by a fastening screw and a fastening nut. The fastening means 23a can also be formed by a clamping element.

The connecting element 12 according to FIG. 2 substantially corresponds to the connecting element 12 according to FIG. 1. The connecting element 12 according to FIG. 2 additionally has one or more further through-openings which serve as mounting openings for mounting the intermediate element 14 on the suspension strut cup 11. Furthermore, the damping element 13 according to FIG. 2 corresponds to the damping element 13 according to FIG. 1. The intermediate element 14 has all the structural features of the connecting element 12 according to FIG. 1. The intermediate element 14 has an intermediate element surface 24 which corresponds to the connecting element surface 21. By contrast with the connecting element 12, the intermediate element 14 can be formed in such a way that the intermediate element 14 projects radially outwardly beyond the connecting element 12.

As described above, the damping element 13 is arranged between the intermediate element 14 and the connecting element 12. The suspension strut cup 11 is thus connected to the connecting element 12 via the intermediate element 14 and the damping element 13. The suspension strut cup 11, the connecting element 12, the damping element 13 and the intermediate element 14 have a common longitudinal axis 23.

The damping element 13 is adhesively bonded to the connecting element 12 and the intermediate element 14 in a force-transmitting manner. Specifically, the first contact surface 19 of the damping element 13 is adhesively bonded to the intermediate element surface 24 of the intermediate element 14 in a force-transmitting manner. Furthermore, as described in FIG. 1, the second contact surface 20 of the damping element 13 is adhesively bonded to the connecting element surface 21 of the connecting element 12. The damping element 13 is connected to the intermediate element 14 and the connecting element 12 by adhesive bonding in a tensile-force-resistant manner.

The damping element 13 is substance-to-substance bonded to the intermediate element 14 and the connecting element 12 by adhesive bonding. The damping element 13 can also be substance-to-substance bonded to the intermediate element 14 and the connecting element 12 by adhesive bonding and be connected thereto in a positive-locking manner. The first contact surface 19 of the damping element 13 is adhesively bonded, partially or over its whole surface, to the intermediate element 14.

According to FIG. 2, the damping element 13 interacts with the connecting element 12 and the intermediate element 14 for the purpose of transmitting a tensile force and/or a compressive force.

LIST OF REFERENCE SIGNS

10 Decoupling bearing
11 Suspension strut cup
12 Connecting element
13 Damping element
14 Intermediate element
15 Edge
15a First edge
15b Second edge
16 Cup bottom
17 Cup wall
18 Cup bottom surface
19 First contact surface of the damping element
20 Second contact surface of the damping element
21 Connecting element surface
22 Fastening means
23 Longitudinal axis
24 Intermediate element surface

What is claimed is:

1. A decoupling bearing for a suspension strut, the decoupling bearing comprising:
    a suspension strut cup extending along a longitudinal axis, with the longitudinal axis being perpendicular to and passing through a cup bottom of the suspension strut cup;
    a connecting element that is connectable to a vehicle body;
    a damping element disposed between and connecting the suspension strut cup and the connecting element; and
    an intermediate element that is connected to the suspension strut cup,
    wherein the damping element is adhesively bonded to the connecting element and to the intermediate element that is connected to the suspension strut cup, with the intermediate element being positioned between the damping element and the suspension strut cup,
    wherein both the damping element and the intermediate element extend farther in radial planes that are perpendicular to the longitudinal axis than the damping element and the intermediate element extend longitudinally.

2. The decoupling bearing of claim 1 wherein the damping element interacts with the connecting element and the intermediate element to transmit a tensile force and/or a compressive force.

3. The decoupling bearing of claim 1 wherein the damping element has a contact surface by way of which the damping element is adhesively bonded over its entire surface, including at the longitudinal axis.

4. The decoupling bearing of claim 1 wherein the damping element has a contact surface by way of which the damping element is adhesively bonded at least partially.

5. The decoupling bearing of claim 4 wherein at least one of the suspension strut cup, the connecting element, or the intermediate element has a planar contact surface that is adhesively bondable to the contact surface of the damping element at the longitudinal axis.

6. The decoupling bearing of claim 1 wherein the damping element is comprised of polyurethane.

7. The decoupling bearing of claim 1 wherein the damping element is comprised of cellular polyurethane.

8. The decoupling bearing of claim 1 wherein the damping element is disc-shaped, solid, and central cavity-free.

9. The decoupling bearing of claim 1 wherein an edge of the damping element where a radially-outward facing surface and a longitudinal end face of the damping element come together is rounded-off.

10. The decoupling bearing of claim 1 wherein the intermediate element is releasably connected to the suspension strut cup.

11. A suspension strut with a decoupling bearing that comprises:
   a suspension strut cup extending along a longitudinal axis, with the longitudinal axis being perpendicular to and passing through a center of a cup bottom of the suspension strut cup;
   a connecting element that is connectable to a vehicle body; and
   a damping element disposed between and connecting the suspension strut cup and the connecting element, with the damping element being a solid, integral, one-piece construction, wherein the damping element is adhesively bonded to the connecting element and to at least one of the following in a force-transmitting manner:
   the suspension strut cup or
   an intermediate element that is connected to the suspension strut cup,
   wherein at the longitudinal axis a planar surface of the damping element is in direct contact with a planar surface of the at least one of the suspension strut cup or the intermediate element.

12. The suspension strut of claim 11 configured as a pneumatic suspension strut.

13. The suspension strut of claim 11 wherein the damping element is a solid, central cavity-free, one-piece construction.

14. The suspension strut of claim 11 wherein an entirety of a longitudinal end face of the damping element is in contact with the suspension strut cup or the intermediate element.

15. The suspension strut of claim 11 comprising the intermediate element, wherein the intermediate element extends farther radially from the longitudinal axis than does any portion of the damping element.

16. A decoupling bearing for a suspension strut, the decoupling bearing comprising:
   a suspension strut cup extending along a longitudinal axis, with the longitudinal axis being perpendicular to and passing through a cup bottom of the suspension strut cup;
   a connecting element that is connectable to a vehicle body; and
   a damping element disposed between and connecting the suspension strut cup and the connecting element, wherein the damping element is adhesively bonded to the connecting element and to at least one of the following in a force-transmitting manner:
   the cup bottom of the suspension strut cup or
   an intermediate element that is connected to the cup bottom, with the intermediate element being positioned between the damping element and the cup bottom,
   wherein either the damping element or the intermediate element is in direct contact with a majority of a surface area of a longitudinal end face of the cup bottom.

17. The decoupling bearing of claim 16 wherein the damping element is a solid, central cavity-free, one-piece construction that is in direct contact with the cup bottom or the intermediate element at the longitudinal axis.

18. The decoupling bearing of claim 16 wherein an entirety of a longitudinal end face of the damping element is in contact with the suspension strut cup or the intermediate element.

19. The decoupling bearing of claim 16 comprising the intermediate element, wherein the intermediate element extends farther radially from the longitudinal axis than does any portion of the damping element.

20. The decoupling bearing of claim 16 comprising the intermediate element, wherein the damping element has a greater longitudinal extent than does the intermediate element, wherein both the connecting element and the intermediate element extend farther radially from the longitudinal axis than does the damping element.

* * * * *